United States Patent [19]

Mollier et al.

[11] Patent Number: 4,656,474
[45] Date of Patent: Apr. 7, 1987

[54] PROCESS AND APPARATUS FOR AUTHENTICATING THE SIGNATURE OF A SIGNED MESSAGE

[75] Inventors: Jean H. Mollier, Bougival; Charles J. Saada, Saint Cloud, both of France

[73] Assignee: Compagnie Internationale pour l'Informatique Cii-Honeywell Bull (Societe Anonyme), Paris, France

[21] Appl. No.: 799,300

[22] Filed: Nov. 20, 1985

Related U.S. Application Data

[63] Continuation of Ser. No. 698,738, Feb. 5, 1985, abandoned, which is a continuation of Ser. No. 428,866, Sep. 30, 1982, abandoned.

[30] Foreign Application Priority Data

Oct. 9, 1981 [FR] France .................... 81 19090

[51] Int. Cl.⁴ .................... H04Q 9/00; G06K 5/00
[52] U.S. Cl. .................... 380/23; 235/380; 340/825.34
[58] Field of Search .................... 340/825.3, 825.34; 235/380; 178/22.08

[56] References Cited

U.S. PATENT DOCUMENTS

| | | | |
|---|---|---|---|
| 4,193,131 | 3/1980 | Lennon et al. | 340/825.34 |
| 4,206,315 | 6/1980 | Matyas et al. | 340/825.34 |
| 4,211,919 | 7/1980 | Ugon | 235/487 |
| 4,216,577 | 8/1980 | Badet et al. | 29/831 |
| 4,222,516 | 9/1980 | Badet et al. | 235/492 |
| 4,259,720 | 3/1981 | Campbell | 340/825.34 |
| 4,264,782 | 4/1981 | Konheim | 178/22 |
| 4,326,098 | 4/1982 | Bouricius et al. | 340/825.3 |
| 4,349,695 | 9/1982 | Morgan et al. | 178/22.08 |
| 4,417,338 | 11/1983 | Davida | 340/825.34 |
| 4,423,287 | 12/1983 | Zeidler | 340/825.34 |
| 4,438,824 | 3/1984 | Mueller-Schloer | 340/825.34 |
| 4,467,139 | 8/1984 | Mollier | 178/22.08 |

FOREIGN PATENT DOCUMENTS 0021401 7/1981 European Pat. Off. .
0035448 9/1981 European Pat. Off. .

OTHER PUBLICATIONS

8081 Proceedings of the Nal. Electr. Conf., vol. 35 (1981), Oct., Oak Brook, Illinois, USA, Miles E. Smid.

Primary Examiner—Donald J. Yusko
Attorney, Agent, or Firm—Kerkam, Stowell, Kondracki & Clarke

[57] ABSTRACT

A process and a device for authenticating the signature of a signed message includes a nominal signature card (1a) coupled to a transmitting device 1 which sends signed messages. The card (1a) includes at least one memory (5) in which there are secretly prerecorded at least one secret key (S) and one program (P) which automatically processes the signature of a message (M), as well as circuits (6) for computing the signature (SG). A control card (3b), which is not nominal, is coupled to a device (3) for receiving signed messages. The card (3b) includes at least one memory in which there are secretly prerecorded at least the secret key (S) and the program (P) for recomputing via processing circuits (15) the signature (SG) of the received message (M).

14 Claims, 1 Drawing Figure

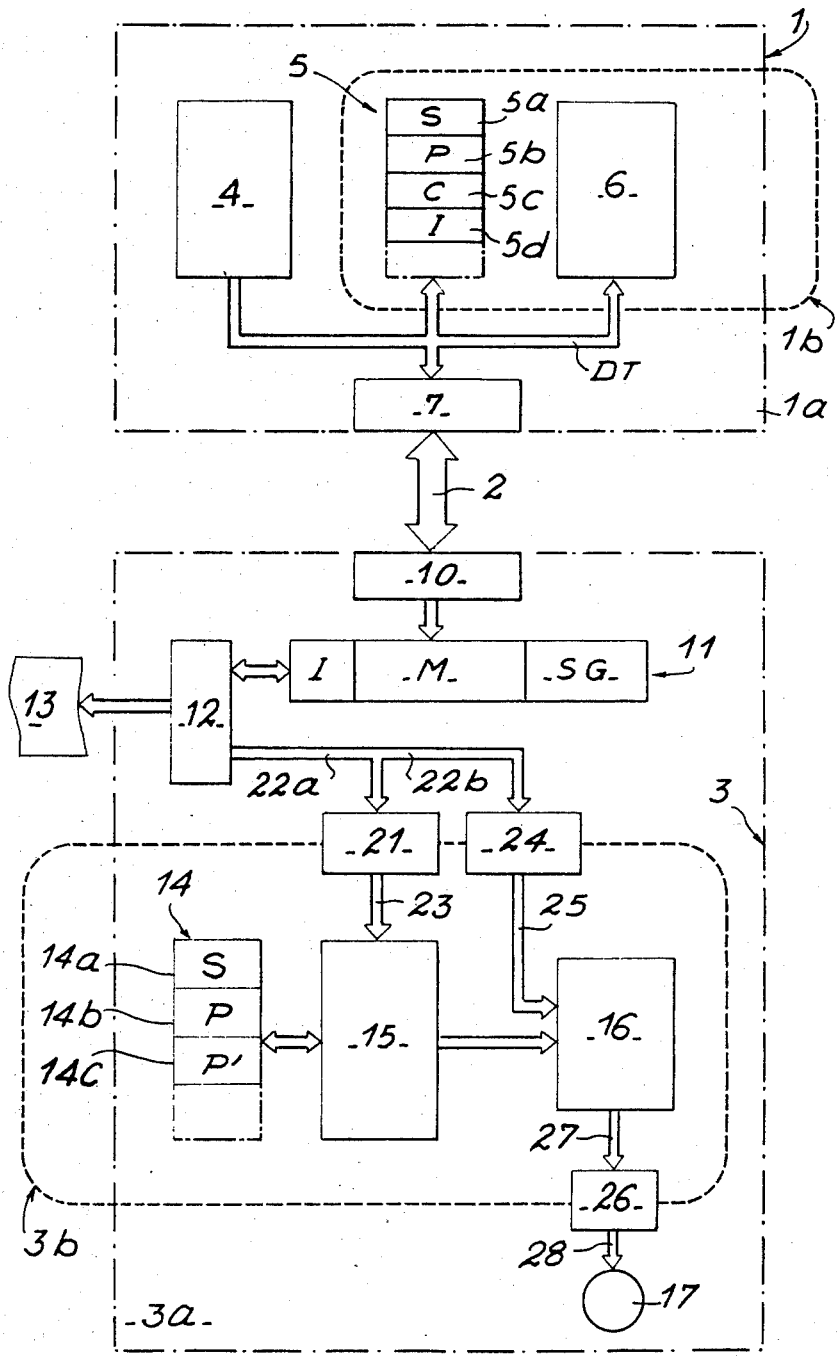

PROCESS AND APPARATUS FOR AUTHENTICATING THE SIGNATURE OF A SIGNED MESSAGE

This is a continuation of application Ser. No. 698,738, filed 02/05/85 (abandoned), which is a continuation of application Ser. No. 428,866, filed 09/30/82 (abandoned).

The invention generally relates to, and essentially has as its object, a process and an apparatus for authenticating the signature of a signed message received by a receiving device and sent by a transmitting device via some transmission path.

Generally speaking, a message is signed the moment the signature of the sender of this message is joined thereto. For a better understanding of the invention, it is important to define in advance what is really meant by "message" and by "signature".

Message: A message is composed of any sequence of alphanumeric characters representing a straight forward or a coded text, said sequence may be advantageously replaced by an abbreviated representation, using Hamming codes, for example.

Signature: A signature is composed of any sequence of alphanumeric characters representing the identity of the sender of the message, who may either be a natural or a juristic person.

In the majority of cases, joining a signature to a message is actually simply juxtaposing the contents of the message with the signature of the sender of the message. Indeed, signing a message amounts only to joining a signature side by side with the message, generally with a punctuation mark inserted therebetween.

Thus, it is understandable that such a juxtaposition gives a fraudulent person the possibility to combine at will messages and signatures of different origins.

To overcome this major drawback of the absence of any real link between a message and its signature, the applicant has described in its French patent application No. 80 07 912 filed on Apr. 9, 1980, which corresponds to U.S. Pat. No. 4,467,139 issued Aug. 21, 1984, a transmission system which joins automatically and indissociably the contents or the text of a message to its signature. Thus, to each message from the same signer corresponds a different signature, and two identical messages transmitted by different people do not have the same signature. The processing of such a signature essentially calls for a signature computing program which takes into account not only the contents of the message, but also at least one parameter called "secret key", unknown even to the sender of the message.

Thus, if this system enables one to limit the dangers of fraud, the authentication of the signature of a message becomes more complex, given the fact that a different signature is joined to any message from the same sender.

The object of the present invention is specifically to design a process which enables one to authenticate in a simple way the signature of a message processed automatically as described in the patent cited above without, however, giving anybody the means to acquaint himself with the real signature of a message whose signature may have been voluntarily or involuntarily modified.

Therefore, the object of the invention is a process for authenticating the signature of a signed message received by a receiving device and sent by a transmitting device via some transmission path, the signature of a message being automatically processed at the transmitting device by means of a signature computing program which calls at least for the contents of the message to be transmitted as well as for a parameter or secret key unknown to the sender of the message, characterized in that, in order to check the authenticity of the signature of a message received by the receiving device, it comprises:

automatically recomputing the signature of the received message via at least the same signature computing program mentioned earlier, taking into account the contents of the received message, as well as the same secret key also mentioned earlier and unknown to the receiver of the message;

automatically comparing the signature of the received message with the signature recomputed by the receiving device; and indicating to the recipient of the message only whether the reresult is identical to, or different from, the previous comparison, while preventing the recipient of the message from acquainting himself with the value of the recomputed signature.

However, although unknown to the person transmitting a message, the secret key mentioned above is nevertheless assigned to this person and to this person alone. Thus, if the receiving device takes only one secret key into account, it will be able to authenticate only signatures of signed messages transmitted by the one and only person to which this secret key has been assigned.

To remove this limitation, the process according to the invention provides, at the receiving device, the possibility of authenticating signed messages transmitted by different people.

Hence, according to another important feature of the invention, the process comprises:

at the transmitting device, authorizing several people to transmit signed messages with automatic processing of the signature, each person having, on the one hand, his own secret key unknown to that person and, on the other, a non-secret identity transmitted with the message, and at the receiving device before recomputing the signature of the received message, automatically determining the secret key of the sender of the message via the sender's identity transmitted with the message.

Thus, the identity of the signer of a message is defined:

explicitly, by his identity which he transmits to the addresee, and implicitly, through the use of a secret key utilized during the processing of the signature.

Therefore, there is a pair (identity/secret key) which cannot be disassociated.

According to another important feature of the invention, the process comprises subdividing the secret key of each person transmitting a message into n elementary secret keys chosen from among m elementary secret keys gathered in a secret memory area of the receiving device, and in identifying each transmitting person by n parameters which represent the addresses of the n elementary keys in the previously mentioned memory area, said n parameters being transmitted with the message in order to enable the receiving device to automatically and secretly compute, e.g., by means of a program, the secret key of the transmitting person before recomputing the signature of the received message.

The invention also relates to an apparatus designed to carry out the process described above and of the type consisting of a transmitting device linked to a receiving device via some transmission path, said transmitting device including at least one storage device in which are recorded at least one signature computing program and one parameter or secret key unknown to the sender of the message; a processing circuit which automatically processes the signature of a message by means of the computing program previously mentioned, taking into account the contents of the message as well as the secret key mentioned earlier, characterized in that the receiving device includes at least:

one storage device in which are recorded at least the computing program previously mentioned and the secret key mentioned earlier as well and unknown to the recipient of the message;

processing circuits which recompute the signature of a received message by means of the contents of the message, the program, and the secret key;

a comparator, the first input of which receives from the outside the signature of the received message, the second input receiving the signature recomputed by the processing circuits mentioned earlier, and a fault indicator having at least two stable states indicating, respectively, the true or the discrepant results of the previously mentioned comparison, the input of the fault indicator being linked to the output of the comparator mentioned earlier.

According to another important feature of the apparatus of the invention, the storage device of the receiving device contains a first secret area in which are prerecorded the m elementary keys previously mentioned and a second area in which is prerecorded a second program or a program for computing the secret key of the person transmitting a message by means of the n parameters mentioned earlier representing the addresses of the n elementary keys and transmitted with the message.

According to another important feature of the invention, the transmitting device comprises two parts: a fixed part which can be accessed by any person designated to ensure the transmission of a message, and a portable device, called the personal signature card, for each person and containing in a manner inaccessible from the outside the secret key of the person, the processing circuits which compute the signature of a message by means of the contents of the message and of the secret key and, preferably, the automatic processing program for this signature, and the receiving device consists of two parts: a fixed part which can be accessed by any person likely to receive a message, and a portable device, called a control card, available to several people and containing in a manner inaccessible from the outside the previously mentioned storage device, the processing circuits, and the comparison circuit.

Other features, advantages, and details will become apparent from the ensuing description with reference to the accompanying drawing which represents schematically in the form of a block diagram a preferred embodiment of the invention.

The problem presented and solved by the invention consists in authenticating at the time of receipt the signature of a signed message transmitted via some transmission path.

Assume we have a transmitting device (1) of the kind described in the previously mentioned U.S. Pat. No. 4,467,139 and which needs no detailed description. This transmitting device (1), made available to at least one transmitting natural person or a representative of a juristic person, is connected via some transmission path, such as shown at (2), to a receiving device (3) made available to at least one receiving natural person or a representative of a juristic person.

In order to understand the invention, it suffices to know that the transmitting device (1) includes at least:

a data logger (4) such as, for example, the typewriter of a word processor designed to take up a message M to be transmitted and, if necessary, capable of converting it into an abbreviated representative message (using Hamming codes, for example);

a storage device (5) or memory which includes at least two areas (5a) and (5b), the area (5a) being inaccessible from the outside and containing the secret key S of a person, the area (5b) containing a computing program P for the signature SG;

processing circuits (6) for running the signature computing program P and connected to the storage device (5) and to the data logger (4);

circuit (7) connected to the processing circuits (6) and the data logger (4) in order to join the contents of the message M with its signature SG computed by the processing circuits (6) and, if need be, to code the message M to make it incomprehensible to everyone, and to ensure its transmission via the transmission path (2) to the receiving device (3)

The group of links between the various preceding elements is shown schematically by means of a link bus DT.

Advantageously, the transmitting device (1) consists of 2 parts:

a fixed device (1a) accessible to anyone and designed to ensure the transmission of a message with or without automatic processing of the signature; and a portable device (1b) or personal signature card for each person containing, inaccessible from the exterior, the secret key assigned by name to a person and unknown to said person, the storage device (5), and the processing circuits (6).

The receiving device (3) includes at least:

a circuit (10) which receives the signed message M and is designed to reconstruct the message to its original form according to its mode of transmission, which is determined by the circuit (7) of the transmitting device (1);

a display device (11) linked to the circuits (10) for explicitly displaying the original signed message, said display device (11) being advantageously linked to an I/O device (12) so as to enable the received signed message to be printed on a paper medium (13), for example;

a storage device (14) or memory which includes at least three areas (14a), (14b), and (14c), in which are prerecorded, respectively, m elementary secret keys, the computing program P for the signature SG mentioned earlier, and a second computing program P' for the secret key of the person who has transmitted a message;

processing circuits (15) connected to the storage device (14) and to the I/O device (12), said processing circuits having access to the data stored in the memory (14);

a comparison circuit (16), one input of which is connected to the output of the processing circuits (15) and the other input is connected to the I/O device (12), and a fault-indication circuit (17) with two stable states, such as a lamp, the inlet of which is connected to the output of the comparison circuit (16).

According to an essential feature of the invention, the area (14a) of the memory (14), the processing circuits (15), and the comparator (16) shall be inaccessible from the exterior in order to prevent any third party from acquainting itself with the data recorded and processed by said circuits. Preferably, the programs P and P' are made inaccessible from the exterior as well.

Advantageously, the receiving device (3) consists of two parts:

a fixed part (3a) including the circuitry (10), the display device (11), the I/O device (12), and the fault-indication circuit (17);

a portable second part (3b), called a control card, accessible to several people and containing in a manner inaccessible from the exterior the storage device (14), the processing circuits (15), and the comparison circuit (16).

The signature card (1b) and the control card (3b) are designed and organized according to the techniques described by French patent Nos. 2,337,381 (corresponding to U.S. Pat. Nos. 4,216,577 and 4,222,516 to Badet et al) and 2,401,459 (corresponding to U.S. Pat. No. 4,211,919 to Ugon), all assigned to the assignee of the present invention.

In such a design, the control card (3b) is coupled to the receiving device (3), and only certain inputs/outputs of this card (3b) can be accessed from the exterior. Specifically, referring to FIG. 1, this card (3b) includes a first set of input terminals (21) connected, on the one hand, by links (22a) to the I/O device (12) and, on the other, by links (23) to the processing circuits (15); a second set of input terminals (24) connected, on the one hand, to the I/O device (12) by links (22b) and, on the other, to an input terminal of the comparator (16) by links (25); and a third set of input terminals (26) connected, on the one hand, by links (27) to the output of the comparison circuit (16) and, on the other, to the fault-indication element (17) by links (28).

To assign the signature card (1b) by name, it is important to personalize the same with a confidential code C known to the person to which this card is assigned. Hence, it is necessary to provide for at least a third area (5c) in the memory (5) of the signature card (1b) in which the confidential code C is recorded. This measure will prevent the use of the signature card (1b) by any person other than the one to which this card has been assigned.

The operation of the setup defined above will now be described.

Let it be assumed that a person, called the sender, desires to transmit a message M to another person, called the recipient.

In a first stage, the sender processes his message, its or possible abbreviation, by means of the data logger (4) of the transmitting device (1). The sender joins to his message an identification I which is characteristic of him and is advantageously composed of n parameters representing the addresses of n elementary keys from among the m elementary keys recorded in the secret area (14c) of the memory (14). It may be of advantage to automatically join the identification I of the sender to the message he wishes to transmit. To do this, all that needs to be done is to provide an area (5d) in the memory (5) where the sender's identification I, i.e., the n parameters previously mentioned, is prerecorded.

Should the sender wish to sign his message before transmitting it, he must insert his nominal signature card (1b) into the fixed part (1a) of the transmitting device. Once this coupling has been effected, the sender keys in his confidential code C at the data logger (4). This confidential code C is compared automatically with the confidential code C previously recorded in the area (5c) of the memory (5) of the signature card (1b). If the two codes are found to be identical, the signature card (1b) is validated at the transmitting device (1) and the transmission process of a signed message is then initialized.

In a second stage, the transmitting device (1) automatically processes the signature SG of the message M. This processing is carried out either on the actual message or via an abbreviated form of this message M obtained from the data logger (4), or from the processing circuits (6), or through any suitable device of known construction not shown in the drawing.

This signature SG is computed by the processing circuits (6) by means of the signature computing program P and the secret key S which are pre-recorded, respectively, in the areas (5a) and (5b) of the memory (5). It is important to note that the processing program P for the signature SG can be almost anything, the only condition being that it take into account all the contents of the message so as to be certain that any modification of its contents, however minor, will result automatically in a modification of the value of the signature joined to the message. Since the program P takes into account the secret key S, unknown to the sender, it is impossible for the latter to predetermine in advance the signature SG of the message M he wishes to transmit.

In a third stage, the thusly computed signature SG is joined to the message M and to the identification I by the circuitry (7) and this circuitry may make modifications, i.e. encryst, the message, in order to make the message unintelligible before its transfer to the receiving device (3) via the transmission path (2).

The signed message (M, I, SG) is received by the circuitry (10) of the receiving device (3). The function of this circuitry (10) is essentially to reconstruct the original message M with its signature SG and with its identification I at, for example, the display device (11). Simultaneously with this display, which is not obligatory, the message M, its identification I, and its signature SG may be printed automatically on the paper medium (13) by means of the I/O device (12).

Then, anyone at the receiving device (3) can acquaint himself with the signed message received from the transmitting device (1).

However, if the person at the receiving device (3) considers the message to be addressed to him (very simply, because his name appears in the message), he can ascertain, according to the invention, the authenticity of the signature SG of the message in order to identify its origin. For this purpose, it suffices that this person have in his possession the control card (3b) which may be available to several people.

In a first stage, the person mentioned earlier, or the recipient, must couple the control card (3b) to the receiving device (3) to initialize the authentication process for the signature SG of the received message M.

In a second stage, the authentication process for the signature SG of the received message M consists, first of all, in computing the secret key S of the sender of the message, then in computing the signature SG of this message at the receiving device (3) via the data prerecorded in the control card (3b). To accomplish this, the recipient, supposing that the message is transcribed on the paper medium (13) mentioned earlier, reinserts the text of the message as well as its identification I into the receiving device (3) by means of the I/O device (12). The identification I and the original message or its abbreviated form are transmitted by the input terminals (21) to the processing circuits (15) of the control card (3b) which is coupled to the receiving device (3).

To compute the secret key S of the sender of the message, the processing circuits (15) run the program P' recorded in the area (14c) of the memory (14), said program taking into account the identification I of the message. Specifically, the n representative parameters of this identification I are used as n addresses identifying n elementary keys from among m elementary keys (m n) pre-recorded in the secret area (14a) of the memory (14). The program P' thus goes and finds the n elementary keys that have been addressed, and reconstructs the secret key of the sender of the message by combining these n elementary keys. It is understood that this secret key S determined in this manner must be identical to the secret key which is pre-recorded in the signature card (1b) assigned to the sender of the message.

Thereupon, the processing circuits (15) automatically recompute the signature SG of the message provided by the recipient. To do this, the processing circuits (15) execute the signature computing program P which has been pre-recorded in the area (14b) of the memory (14). This program P is absolutely identical to the program P pre-recorded in the area (5b) of the memory (5) of the signature card (1b) coupled to the transmitting device (1) during the transmission of the message M. This program P takes into account the contents of the message M and the secret key S such as it has been previously determined by the program P'.

In a third stage, the signature SG computed by the processing circuits (15) is sent to an input of the comparison device (16). The other input of the comparison device (16) receives via the input terminals (24) the signature SG provided by the recipient via the I/O device (12). The comparison device (16) compares these two signatures and transmits via the output terminals (26) an excitation signal intended for the fault-indication element (17). This excitation occurs, for example, only if the two signatures correspond exactly to each other.

Under these conditions, the recipient is informed only of the result of the comparison, true or discrepant, of the signature given by the recipient and of the signature computed automatically by means of the receiving device (3).

Thus, the receiving device (3) is able to detect any modification of the message and/or of the identity and/or of its signature without revealing what might have been the value of the signature corresponding to a modified message. Under these circumstances, any fraud becomes impossible and the recipient of a message has the possibility of determining with precision the origin of the received message.

It will be understood that such an identification process requires a certain conformity between the signature card (1b) on the transmission side, and the control card (3b) on the receiving side. These two mediums must contain some common information. In view of the tamper-proof character of these mediums, it is during their manufacture or when they are being assigned to an individual or to a group of individuals that these problems are settled.

As a security precaution, it is likewise of advantage to provide in the receiving device (3) a usage computer (not shown) which limits the number of possible authentications by the control card (3b). Such limitation will prevent an exhaustive search from being conducted with the object of finding the secret key S assigned to an individual.

We claim:

1. A process for authenticating the signature of a message sent by a transmitting device to a receiving device via a transmission path, comprising automatically computing at the transmitting device a signature of a message to be transmitted by using a signature-computing program which takes into account the entire contents of the message to be transmitted and a secret key which is unknown to both a sender and a recipient of the massage;

transmitting the message and signature to the receiving device;

automatically recomputing at the receiving device a signature of the received message by using another signature-computing program which is the same as said first-mentioned signature-computing program, said other signature-computing program taking into account the entire contents of the received message and said secret key;

automatically comparing the signature of the received message with the signature recomputed at the receiving device; and indicating to the recipient of the message in response to said comparing only whether the signature of the received message and the recomputed signature are identical or different, while preventing the recipient from access to the value of the recomputed signature.

2. A process according to claim 1, wherein there are a plurality of message senders at said transmitting device, each sender having his own unique secret key which is unknown to such sender and having a unique non-secret identity code which is transmitted with a message sent by such sender; and wherein the process further comprises, at the receiving device, automatically determining the secret key of the sender of the message from the sender's identity code transmitted with the message prior to said recomputing of the signature of the received message.

3. A process according to claim 2 further comprising subdividing the secret key of each sender into n elementary secret keys chosen from among m possible elementary secret keys; storing said m elementary secret keys in a secret area of a memory of the receiving device; and constructing the identity code of each sender to comprise n parameters which represent the addresses of the locations in said secret memory area at which are stored the n elementary keys which comprise the secret key of such sender; and wherein said determining comprises automatically reconstructing the secret key of the sender from the identity code of the sender which is transmitted with the received message.

4. A process according to claim 3, wherein said reconstructing comprises processing the identity code of the sender using a predetermined program stored in another area of said memory, said program identifying said addresses of said n elementary secret keys, and combining said n elementary secret keys from the secret memory area to form the secret key of the sender.

5. A process according to claim 1 further comprising coupling a portable signature card to said transmitting device and coupling a portable control card to said receiving device, and wherein said computing comprises computing the signature of a message to be transmitted in the signature card, and performing said recomputing of the signature of a received message and the comparing of the signature of the received message with the recomputed signature in the control card.

6. A process according to claim 1 further comprising encrypting the message at the transmitting device prior to said transmitting, and decrypting the received message at the receiving device.

7. Apparatus for authenticating a message sent by a transmitting device to a receiving device via a transmission path, the transmitting device comprising means for automatically computing a signature of a message to be transmitted and for transmitting the computed signature with the message to the receiving device, said computing means comprising first processing means controlled by a first signature-computing program for computing the signature of the message to be transmitted in accordance with the contents of the message and a secret key which is unknown to both a sender and a recipient of the message; and a receiving device comprises means for automatically recomputing the signature of a received message, the recomputing means comprising second processing means controlled by a second signature-computing program which is the same as said first signature-computing program for recomputing the signature in accordance with the contents of the received message and said secret key; means for automatically comparing the signature of the received message with the signature recomputed by said recomputing means; and means responsive to said comparing means for indicating to the recipient of the message only whether the signature of the received message and the recomputed signature are identical or different, while preventing the recipient access to the value of the recomputed signature.

8. Apparatus according to claim 7, wherein the sender has an associated non-secret identity code which is transmitted with the message sent to said receiving device, and wherein said recomputing means includes means for determining the secret key from the sender's identity code which is transmitted with the message received by the receiving device.

9. Apparatus according to claim 8, wherein the secret key is unique to the sender and is subdivided into n elementary secret keys chosen from among m possible elementary secret keys, and the recomputing means comprises a memory having a secret memory area in which are stored said m elementary secret keys, and wherein the identity code of the sender comprises n parameters which represent the addresses of locations in said memory area at which are stored the n elementary secret keys which comprise the secret key of the sender, and the determining means comprises means for automatically reconstructing the secret key of the sender from the n parameters of the identity code of the sender.

10. Apparatus according to claim 9, wherein said reconstructing means comprises another program for controlling said second processing means, said other program being stored in another location of said memory.

11. Apparatus according to claim 7, wherein said automatic signature computing means comprises a portable device adapted to be coupled to said transmitting device, the portable device containing, in a manner inaccessible from the outside thereof, said first processing means, said first signature-computing program, and said secret key.

12. Apparatus according to claim 7, further comprising a portable device adapted to be coupled to said receiving device, the portable device containing, in a manner inaccessible from the outside thereof, said means for recomputing the signature of a received message, said means for comparing the signature of the received message with the recomputed signature, and means for storing said secret code.

13. Apparatus according to claim 12, wherein said second signature-computing program and said secret key are prerecorded in the memory of said portable device during the manufacture of the portable device.

14. Apparatus according to claim 7, wherein said indicating means comprises a fault indicator having two stable states which indicate, respectively, whether the signature of the received message and the recomputed signature are identical or different.

* * * * *